United States Patent [19]

Montagne

[11] 3,774,663
[45] Nov. 27, 1973

[54] TRUCK TIRE HAVING CARCASS EXTENSION

[75] Inventor: Jean Bernard Montagne, Cebazat, France

[73] Assignee: Compagnie Generale des Etablissements Michelin, raison sociale Michelin & Cie, Ferrand, France

[22] Filed: Sept. 30, 1971

[21] Appl. No.: 185,042

[30] Foreign Application Priority Data
Oct. 14, 1970 Great Britain.................. 37,204/70

[52] U.S. Cl. .......................... 152/362 R, 152/354
[51] Int. Cl. ............................................ B60c 15/06
[58] Field of Search ................ 152/362 R, 362 CS, 152/354

[56] References Cited
UNITED STATES PATENTS

| | | | |
|---|---|---|---|
| 3,638,705 | 2/1972 | Devienne | 152/362 R |
| 2,000,869 | 5/1935 | Taylor | 152/362 CS |
| 3,253,639 | 5/1966 | Travers | 152/362 R |
| 3,172,445 | 3/1965 | Boussu et al | 152/354 |

FOREIGN PATENTS OR APPLICATIONS 963,893   7/1964   Great Britain .................. 152/362 R Primary Examiner—Gerald M. Forlenza
Assistant Examiner—George H. Libman
Attorney—Granville M. Brumbaugh et al.

[57] ABSTRACT

A pneumatic tire has a radial carcass formed of one or more plies of cords the ends of which are arranged near the steel wires in the beads. The carcass proper is extended in each bead by at least one additional ply or carcass extension adjacent to or encircling the bead wires and rising in the side. The cords of the additional ply or carcass extension are connected together by a connecting rubber of a grade different from that of the connecting rubber connecting the cords of the carcass proper.

4 Claims, 3 Drawing Figures

PATENTED NOV 27 1973 3,774,663

TRUCK TIRE HAVING CARCASS EXTENSION

BACKGROUND OF THE INVENTION

This invention relates to radial-carcass pneumatic tires and, more particularly, to novel and highly-effective radial-carcass pneumatic tires for use on trucks and the like.

In a tire of the radial-carcass type the carcass is formed of one or more plies of cords arranged in the radial planes of the tire. Each ply is formed of juxtaposed cords embedded in a layer of rubber which adheres to the cords and fills the spaces between adjacent cords. The carcass extends along the inner wall of the tire, from one bead to the other, moves around the steel wire or wires in each bead and extends up again in the sides some distance from the steel bead wires, forming returns of greater or lesser length. The length of these returns is selected so as to assure a satisfactory anchoring of the carcass on the steel bead wires and avoid the danger of loosening under the conditions of use of the tire. In case of truck tires, it is necessary that at least one carcass ply have relatively long returns to assure the anchoring of the carcass, in view of the high inflation pressure and the heating of the beads caused by braking.

It has been discovered that in radial-carcass tires of the type described above, and particularly in tires using a carcass of very elastic cords—for instance polyamide cords—certain defects appear depending on the selection of the rubber connecting the cords in the carcass plies. Thus the selection of a connecting rubber of low modulus of elasticity tends to cause separation of the cords at the ends of the returns of the carcass plies, particularly when the returns are relatively long.

On the other hand, the selection of a connecting rubber of high modulus of elasticity tends to cause tearing of the interstitial rubber between cords in the upper region of the sides, that is to say, in the region of the side contained between the tread and the middle of the side.

Either of these defects can occur is a connecting rubber of intermediate modulus of elasticity is selected for the carcass plies.

SUMMARY OF THE INVENTION

An object of the invention is to remedy the defects of conventional tires noted above. In particular, an object of the invention is to provide a carcass structure which withstands both tearing between cords in the upper zone of the side and separation of the cords and the surrounding rubber in the lower zone, that is to say, between the middle of the side and the steel bead wire, and more particularly at the ends of the carcass plies.

The foregoing and other objects are attained in accordance with the invention by the provision of a radial-carcass tire comprising one or more plies of cords whose ends are arranged near the steel bead wires in the beads and characterized in that the carcass proper is extended in each bead by at least one additional ply or carcass extension which rests on the steel bead wire or wires and winds around them, and then moves up the side and forms the end of the carcass, the cords of this additional ply or carcass extension being connected to each other by a connecting rubber of a grade different from that of the connecting rubber which connects the cords of the carcass proper to each other. The additional ply or plies may be separate from or integral with the carcass ply or plies.

In one embodiment which is applicable to tires whose carcass comprises elastic cords or cords of relatively elastic material, the connecting rubber of the cords of the carcass has a relatively low modulus, while the rubber connecting the cords of the additional plies has a relatively high modulus.

The expression "modulus" as used above relates to the mechanical behavior of the rubber under the conditions of use in the tire. It designates either the dynamic modulus or the static modulus with the frequencies, temperatures and types or amounts of deformation customary in a tire. However, the static modulus of elasticity at 100 percent elongation and 20°C. is in general sufficient to characterize in practice the mechanical behavior of a mixture.

The replacement of a carcass ply having long returns by a carcass ply with short returns extended by an additional ply makes it possible to impart to them a different structure, primarily with respect to the nature of the connecting rubber of the cords.

It is in accordance with the invention to take advantage of this modification further to distinguish the carcass ply or plies from the additional plies which form an extension thereof. Thus the cords of the additional plies can be different from the cords of the carcass plies in material, structure, and/or arrangement. Thus also the cords of these plies can optionally be arranged not in radial planes but along an angle of between 0° and 45° with the radial planes of the tire.

In one embodiment of the invention, the additional plies are arranged along a sinusoidal path and in particular a concave path the concavity of which faces the outside of the tire, for instance.

BRIEF DESCRIPTION OF THE DRAWING

An understanding of additional aspects of the invention can be gained from a consideration of the following detailed description of the preferred embodiments thereof, in conjunction with the appended figures of the drawing, wherein.

DESCRIPTION OF THE PREFERRED EMBODIMENTS

Figure 1:
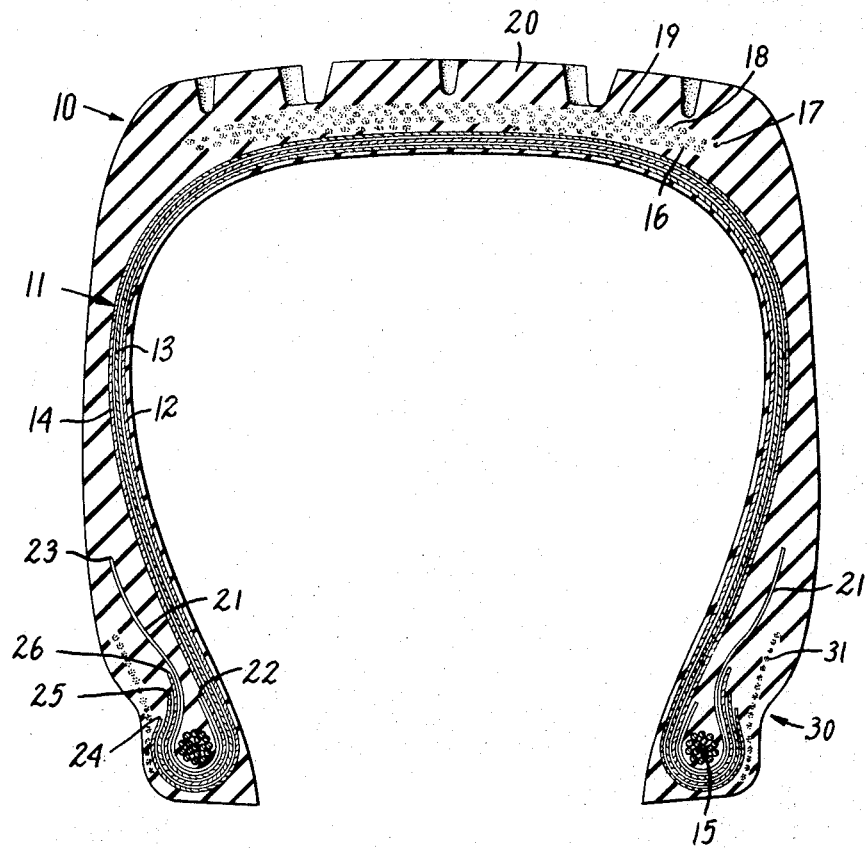
FIG. 1 is a view in radial section of a preferred embodiment of a tire in accordance with the invention.

FIG. 1 shows in radial section a tire 10 of size 10.00-20, that is to say, a tire of a rated load of about 2.5 tons.

This tire has a radial carcass 11 comprising three plies 12, 13, 14 of polyamide cords of type 1680/3 composed of three plies yarns of 1680 denier each. The carcass is wound around two steel bead wires 15, each ply having its ends near the wires. The tire furthermore has in conventional manner a top or crown reinforcement composed of plies 16 to 19 consisting of steel cords and serving to reinforce the tread 20, as well as two beads 30.

In accordance with the invention, there is provided wound around each steel bead wire 15 an additional ply 21 constituting a carcass extension and intended to improve the anchoring of the carcass on the steel bead wires. This ply 21 has its end 22 which is located on the inside of the tire stopping substantially at the level of the region of the ends 24, 25 and 26 of the carcass plies 12, 13, 14. On the other hand, the other end 23 of the ply 21 is radially on the outside of the ends of said carcass plies so as to provide a relatively long return. The ply 21 is preferably arranged between the steel bead wire 15 and the carcass plies. In the example in question, it consists of cords of polyamide 1680/3 identical to those of the carcass.

In accordance with the invention, the connecting rubber of the cords of the ply 21 has a modulus of elasticity of 400 g/mm² at 100 percent elongation, namely a modulus of elasticity which is definitely greater than that of the connecting rubber of the cords of the carcass plies 12, 13, 14, which is equal to 115 g/mm² at 100 percent elongation. The dynamic shear moduli at 10 cycles per second and 20°C. are $100 \times 10^5$ N/m² and $10.0 \times 10^5$ N/m² respectively.

In the example under consideration, the cords of the ply 21 are arranged radially, in the same way as those of the carcass plies. The course of the ply 21 on the outside is sinusoidal and undulated, the end 23 being spaced from the inner wall of the tire and the intermediate portion between the end 23 and the steel bead wire 15 coming close to the inner wall of the tire.

Each bead 30 comprises, moreover, along its outer wall, a stiffener 31 composed of metal cords inclined about 30° to the steel bead wire. This stiffener is intended to reinforce the portion of the bead which is to rub against the wheel rim. It extends over a height less than that of the ply 21.

Tests have shown that loosening of the cords of the ply 21 in the region of the end 23 takes place after a far greater mileage when the cords are rolled into rubber of a modulus of elasticity of 400 g/mm² than when using rubber of a modulus of elasticity of 115 g/mm², as for the carcass plies. Moreover, the presence of the ply 21 avoids a sliding of the carcass 11 around the steel wire, which sliding takes place more easily in the absence of ply 21.

Figure 2:
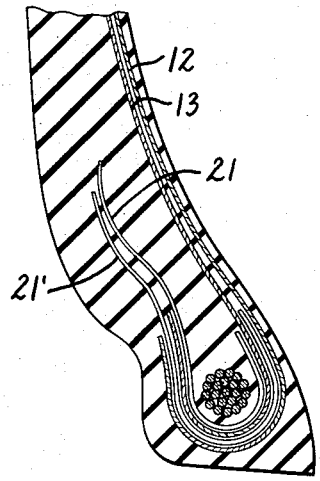
FIGS. 2 and 3 are views on a larger scale in radial section of two other embodiments of a tire bead in accordance with the invention.

FIG. 2 shows an embodiment which differs from the example of FIG. 1 in that the carcass has only two plies 12 and 13, and is extended by two similar plies 21 and 21'.

Figure 3:
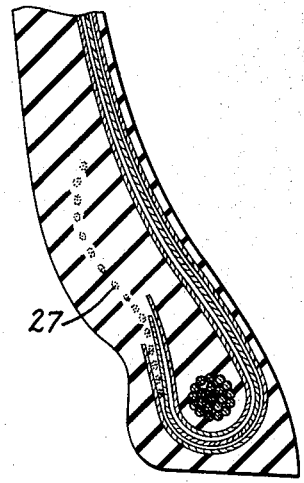

FIG. 3 shows an embodiment in which the cords of the additional ply 27 form an angle of 30° with the radial planes and are sandwiched between two carcass plies and does not pass around the bead wire.

Thus there is provided in accordance with the invention a novel and highly-effective radial-carcass-type tire particularly adapted to give long service on vehicles such as trucks. Many modifications of the representative embodiments described herein will readily occur to those skilled in the art upon study of this disclosure. For example, the use of an additional ply different from a carcass ply is merely a convenience in execution. One could develop a carcass ply the end zones of which acted as additional plies, the cords in such zones being connected by a rubber of a grade different from that of the connecting rubber in the portion between the end zones. Accordingly, the invention is to be construed as including all of the embodiments thereof within the scope of the appended claims.

I claim:

1. A radial pneumatic tire comprising a pair of sidewalls, a pair of beads, at least one bead wire in each bead, a carcass proper, said carcass proper being of the radial type and comprising at least one ply of cords, and a connecting rubber connecting the cords of said carcass proper, said cords being respectively turned outwardly around said bead wires and the ends of said cords being respectively adjacent to said bead wires, said carcass proper being extended in each bead by a carcass extension adjacent a turned out carcass ply at the bead, said carcass extension ending beyond said beads but short of the middle of said sidewalls, said carcass extension comprising cords, further comprising a second connecting rubber connecting the cords of said carcass extension, said second connecting rubber having a modulus of elasticity higher than that of said rubber connecting the cords of said carcass proper.

2. A pneumatic tire according to claim 1 wherein the cords of said carcass extension are separate from the cords of said carcass proper.

3. A pneumatic tire according to claim 1 wherein the cords of said carcass extension are different from the cords of said carcass proper.

4. A pneumatic tire according to claim 1 wherein the cords of said carcass extension follow a path which is concave towards the outside of the tire.

* * * * *

UNITED STATES PATENT OFFICE
CERTIFICATE OF CORRECTION

Patent No. 3,774,663   Dated November 27, 1963

Inventor(s) Jean Bernard Montagne

It is certified that error appears in the above-identified patent and that said Letters Patent are hereby corrected as shown below:

On the Cover Page after [73] Assignee, "Ferrand" should read --Clermont-Ferrand (Puy-de-Dome),--; On the Cover Page after [30] Foreign Application Priority Data, "Great Britain" should read --France--; Col. 1, line 40, "is" should read --if--; Col. 1, line 60, "and" (first occurrence) should read --or--.

Signed and sealed this 1st day of October 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,774,663  Dated November 27, 1973

Inventor(s) Jean Bernard Montagne

It is certified that error appears in the above-identified patent and that said Letters Patent are hereby corrected as shown below:

On the Cover Page after [73] Assignee, "Ferrand" should read --Clermont-Ferrand (Puy-de-Dome),--; On the Cover Page after [30] Foreign Application Priority Data, "Great Britain" should read --France--; Col. 1, line 40, "is" should read --if--; Col. 1, line 60, "and" (first occurrence) should read --or--.

This certificate supersedes Certificate of Correction issued Oct. 1, 1974.

Signed and sealed this 21st day of January 1975.

SEAL)
ttest:

cCOY M. GIBSON JR.
ttesting Officer

C. MARSHALL DANN
Commissioner of Patents